United States Patent Office 3,127,423
Patented Mar. 31, 1964

3,127,423
PHENYL DERIVATIVES OF METHYLSTEROLS
AND PROCESS FOR PRODUCTION THEREOF
Josef Fried, Princeton, and Gerald W. Krakower, Elizabeth, N.J., assignors to Olin Mathieson Chemical Corporation, New York, N.Y., a corporation of Virginia
No Drawing. Filed Sept. 21, 1962, Ser. No. 225,397
8 Claims. (Cl. 260—397.2)

This invention relates to and has as its objects the provision of new physiologically active steroids, methods for preparing the same, and new intermediates useful in said preparation.

The final products of this invention can be represented by the formulae:

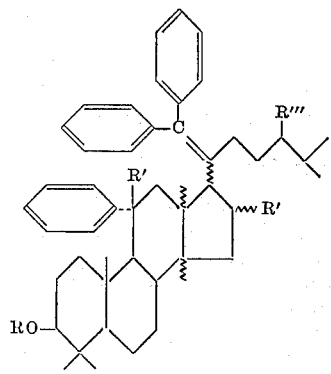

and

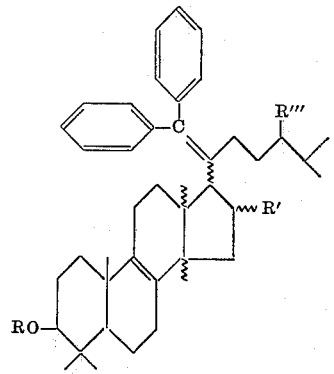

wherein R is selected from the group consisting of hydrogen and the acyl radical of a hydrocarbon carboxylic acid of less than ten carbon atoms; R''' is selected from the group consisting of hydrogen and lower alkyl; and R' is selected from the group consisting of hydrogen and hydroxy. (In this application and in the appended claims, whenever, in the formulae set forth herein, a curved line ($\{$) is employed in the linkage of atoms, it is meant to denote that the connected atom may be either in the alpha or beta position, as is determined in the respective compounds involved.)

The preferred acyl radicals are those of hydrocarbon carboxylic acids of less than ten carbon atoms as exemplified by the lower alkanoic acids (e.g., acetic, propionic, butyric and tert-pentanoic acids), the lower alkenoic acids, the monocyclic aryl carboxylic acids (e.g., benzoic and toluic acids), the monocyclic aryl lower alkanoic acids (e.g., phenacetic and β-phenylpropionic acids), the cycloalkane carboxylic acids and the cycloalkene carboxylic acids.

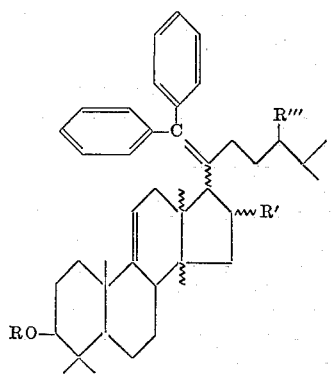

The compounds of this invention are physiologically active steriods which possess anti-androgenic activity and which may be used in place of such known anti-androgenic steroids as A-norprogesterone in the treatment of such conditions as acne or hirsutism. Administration of the products of this invention may be accomplished either perorally or parenterally, in the same manner as A-norprogesterone, for example, the dosage and/or concentration being adjusted for the relative potency of the particular steroid.

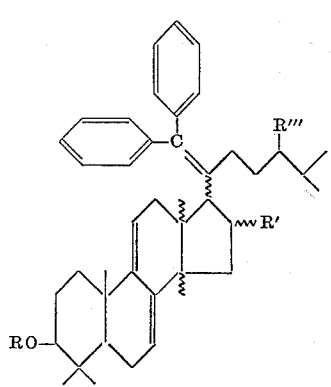

The final products of this invention are prepared by the process of this invention which entails a number of steps beginning with a triterpenoid acid as a starting material. By a triterpenoid acid, it is here meant a polymethylsteroid, having a D-ring structure represented by the formula:

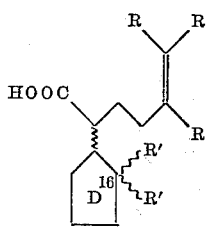

wherein R may be the same or different and may be either hydrogen or alkyl and R' may be the same or different and may be selected from the group consisting of hydrogen and hydroxy. Examples of the triterpenoid acids which may be employed in the practice of this invention include eburicoic, polyporenic, tumulosic, pinicolic, elemolic, elemonic, dehydroeburicoic, dehydroelemolic, dehydroelemonic, and other like acids. The steps of the process (employing eburicoic acid as the starting material) are shown by the following equations wherein R and R' are the same or different and represent hydrogen, lower alkyl, or acyl:

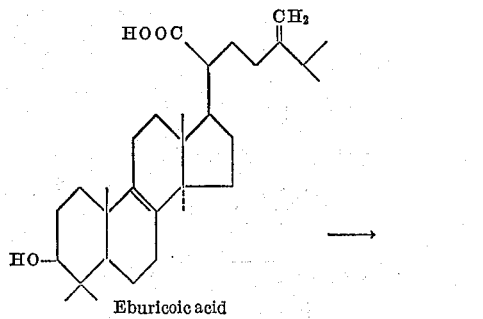

Eburicoic acid

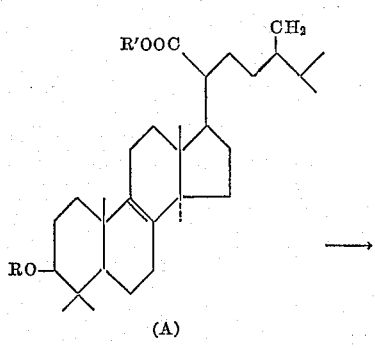

(A)

I R=CH$_3$CO; R'=H
II R=CH$_3$CO; R'=CH$_3$

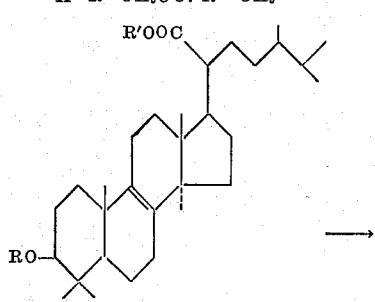

(B)

III R=H; R'=CH$_3$
IV R=CH$_3$CO; R'=CH$_3$

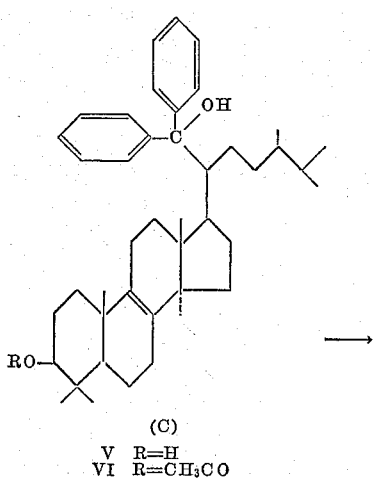

(C)

V R=H
VI R=CH$_3$CO

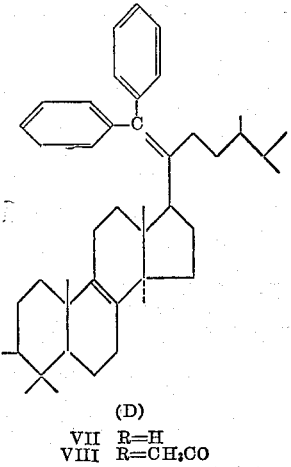

(D)

VII R=H
VIII R=CH$_3$CO

In the first step of the process of this invention, eburicoic acid is converted to its 3-ester derivative (Compounds A). The 3-acetate of eburicoic acid is a known compound. Other 3-esters can be prepared in the usual manner by reacting eburicoic acid with the desired acylating agent (e.g., acyl chloride or acid anhydride) in the presence of a base, such as pyridine. Although any ester can be thus prepared, the preferred esters are those with hydrocarbon carboxylic acids of less than ten carbon atoms. These are formed by reaction with the acyl chloride or acid anhydride of a hydrocarbon carboxylic acid of less than ten carbon atoms, such as one of the acids listed hereinbefore.

The 3-ester is then converted to the corresponding $\Delta^8$-eburicene esters (Compounds B). Compounds B are produced by first methylating the 3-acetate esters, as by reaction with diazomethane in ether to produce the methylated 3-acetate ester of eburicoic acid. The methylated acetate ester is then treated with hydrogen in the presence of a hydrogenation catalyst to produce the $\Delta^8$-eburicene esters (Compounds B).

Compounds B are then treated with phenyl lithium, and held at an elevated temperature under a nitrogen blanket for an extended period of time to yield the 21,21-diphenyl-$\Delta^8$-eburicenes (Compounds C) which are new compounds of this invention.

To form the final products of this invention the 21,21-diphenyl-$\Delta^{8,20}$-eburicadienes (Compounds D) the 21,21-diphenyl-$\Delta^8$-eburicenes (Compounds C) are dehydrated as by treatment at elevated temperatures with glacial acetic acid or benzene and iodine, thus yielding Compounds D which are new compounds of this invention.

In addition to the foregoing process, further steps may be employed to obtain further new products of this invention. The basic starting material for this additional process may be the same triterpenoid acid employed in the hereinbefore disclosed process, which starting material is the source of the reactant employed in obtaining the additional products of this invention. The following equations represent the process whereby the additional products are obtained; wherein R and R' are as hereinbefore defined, and R" represents hydrogen:

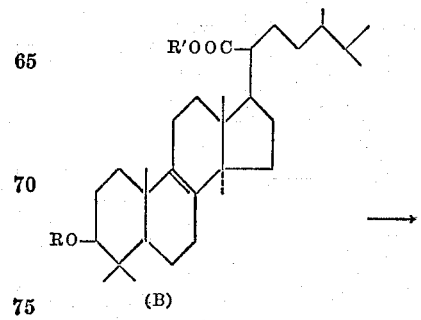

(B)

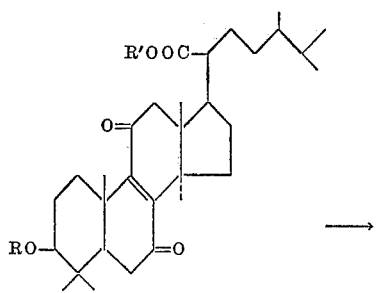

(E)
IX R=CH₃CO; R'=CH₃

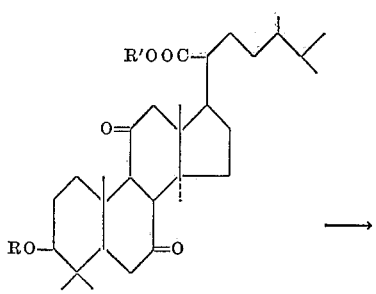

(F)
X R=CH₃CO; R'=CH₃

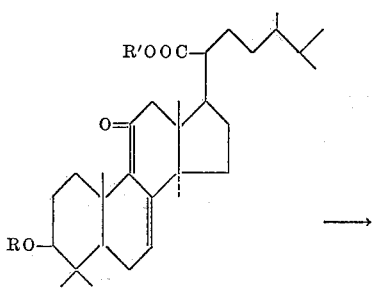

(G)
XI R=CH₃CO; R'=CH₃
XII R=H; R'=CH₃

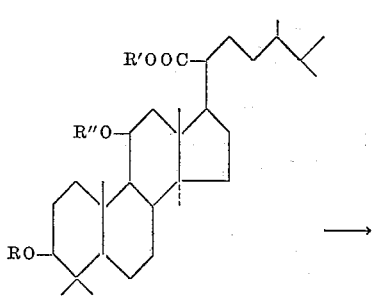

(H)
XIII R=CH₃CO; R'=CH₃; R''=H

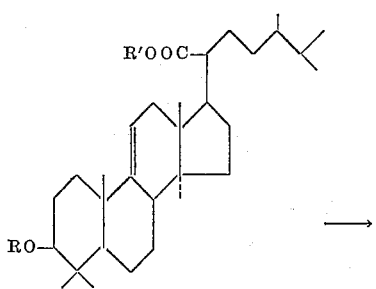

(J)
XIV R=CH₃CO; R'=CH₃

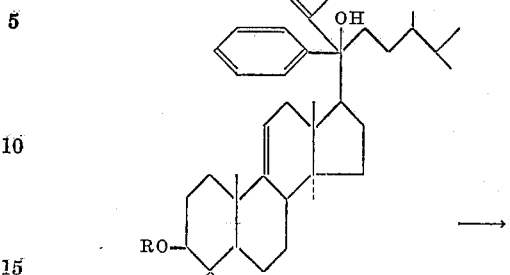

(K)
XV R=H
XVI R=CH₃CO

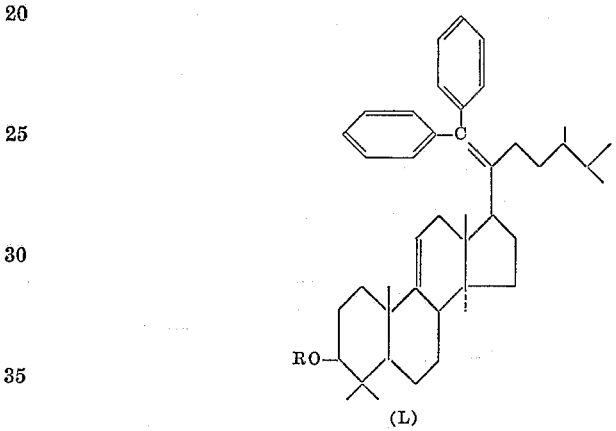

(L)
XVII R=CH₃CO
XVIII R=H

In the first step of this alternate process, Compounds B are oxidized as by treatment with an oxidizing agent, for example, chromic acid in an acetic acid medium to produce the $\Delta^8$-eburicene-7,11-diones (Compounds E).

Compounds E are then reduced, as by treatment with zinc in glacial acetic acid, preferably at elevated temperatures to produce the eburicane-7,11-diones (Compounds F).

Compounds F are then converted to the 11-keto-eburicanes (Compounds G) by treatment with hydrazine and a base, such as potassium hydroxide, at elevated temperatures. In addition to the reduction of the 7-keto group, there occurs hydrolysis of the ester groups at $C_3$ and $C_{21}$ and the latter are reformed by treatment first with an acylating agent (e.g., acid anhydride or acyl halide) in the presence of a base (e.g., pyridine) followed by treatment with a methylating agent (e.g., ethereal diazomethane), to produce Compounds G.

Compounds G are treated with lithium borohydride in tetrahydrofuran to produce the 11-hydroxyeburicanes (Compounds H). Compounds H are then treated with methanesulfonyl chloride and pyridine in dimethylformamide to yield the $\Delta^{9(11)}$-eburicenes (Compounds J).

Compounds J may then be treated with phenyl lithium, and held at an elevated temperature under a nitrogen blanket for an extended period of time to yield the 21,21-diphenyl-$\Delta^{9(11)}$-eburicenes (Compounds K) which are new compounds of this invention.

Compounds K are then dehydrated as by treatment with glacial acetic acid at elevated temperatures, to yield the 21,21-diphenyl-$\Delta^{9(11),20}$-eburicadienes, which are also new final products of this invention.

Still more new final products may be obtained from the additional processing of Compounds G. These compounds are treated directly to obtain new final products of this invention by the process set forth in the following equations wherein R, R' and R" are as hereinbefore defined:

by the following equations are obtained, R, R' and R" being the same as hereinbefore defined:

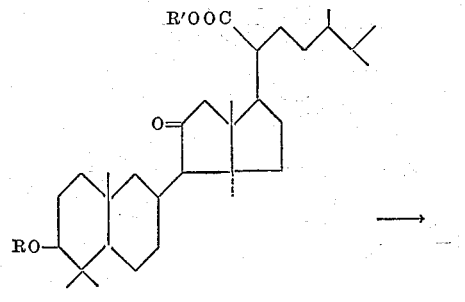

(G)
XII   R=CH₃CO; R'=CH₃

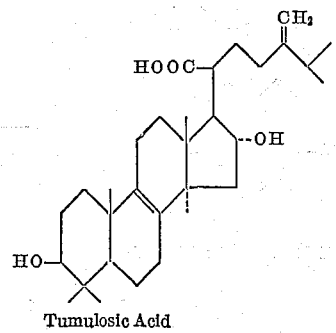

Tumulosic Acid

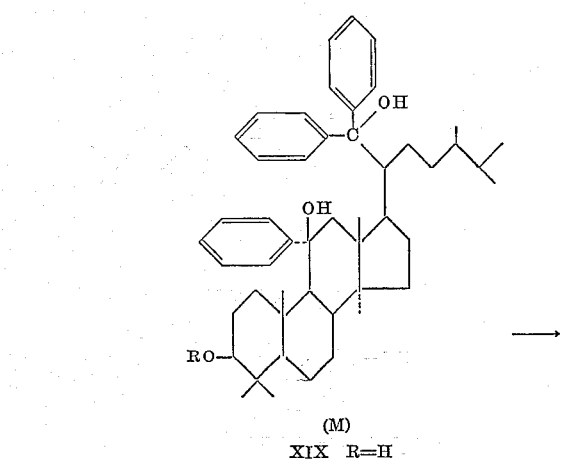

(M)
XIX   R=H

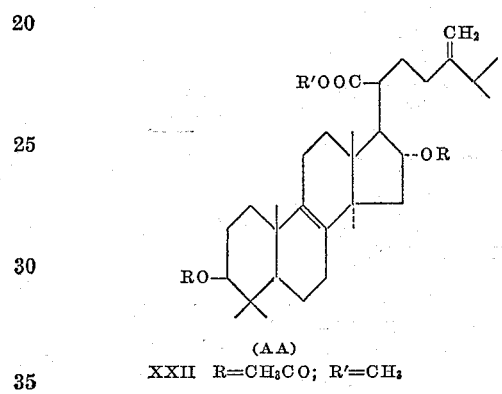

(AA)
XXII   R=CH₃CO; R'=CH₃

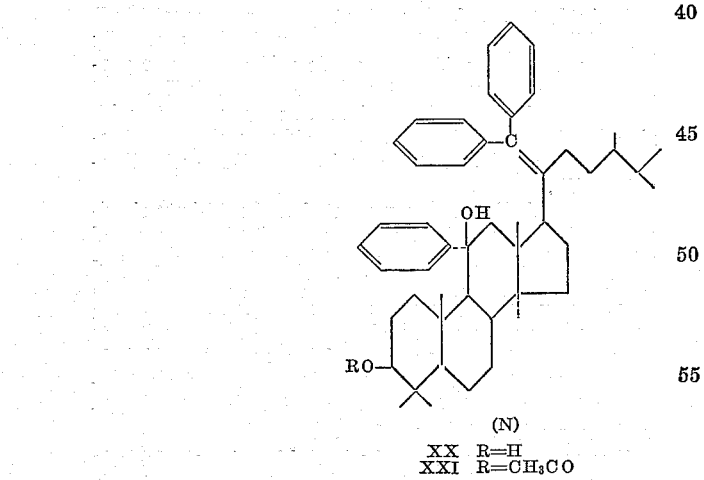

(N)
XX    R=H
XXI   R=CH₃CO

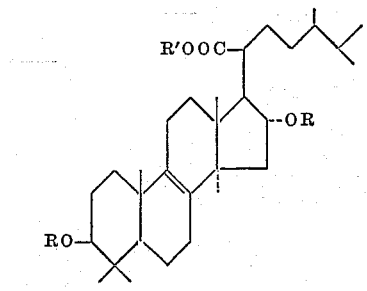

(BB)
XXIII   R=CH₃CO; R'=CH₃
XXIV    R=H; R'=CH₃

Compounds G are treated with phenyl lithium and held at an elevated temperature under a nitrogen blanket for an extended period of time to yield the 11,21,21-triphenyl-eburicanes (Compounds M) which are new compounds of this invention.

Compounds M are then dehydrated as by treatment with glacial acetic acid at elevated temperatures to yield the 11,21,21-triphenyl-$\Delta^{20}$-eburicenes (Compounds N) which are new final products of this invention.

The procedures set forth hereinabove in the treatment of eburicoic acid may likewise be applied to other triterpenoid acids, thus obtaining like results. For example, when tumulosic acid is treated in accordance with the procedures set forth hereinabove, the results represented

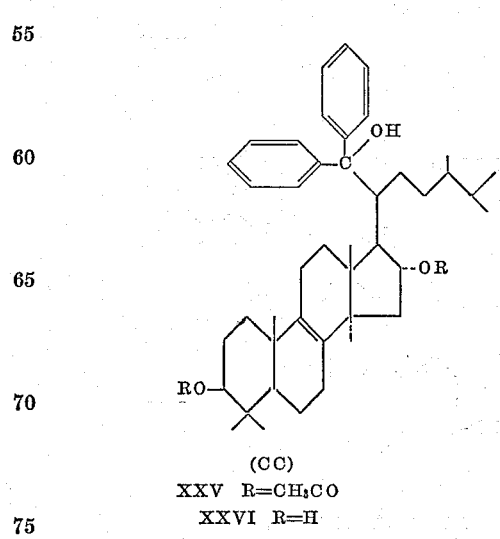

(CC)
XXV    R=CH₃CO
XXVI   R=H

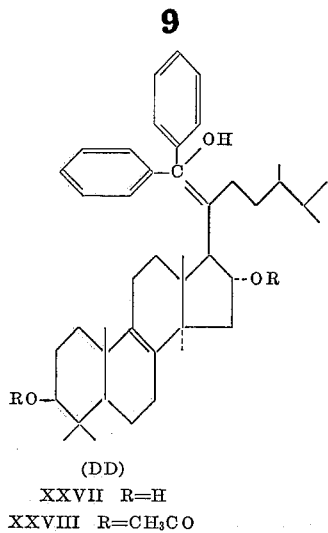

(DD)
XXVII R=H
XXVIII R=CH₃CO

In the first step of this process, tumulosic acid is converted to its 3,16-diester derivative (Compounds AA). The 3,16-diester is then converted to a corresponding diester of Δ⁸-eburicene-21-oic acid (Compounds BB) in the same manner as set forth hereinabove in the production of Compounds B.

Compounds BB are then treated with phenyl lithium, under a nitrogen blanket at elevated temperatures to yield the 16-substituted 21,21-diphenyl-Δ⁸-eburicenes (Compounds CC) which are new compounds of this invention.

Compounds CC may then be dehydrated as by treatment with glacial acetic acid at elevated temperatures to yield the 16-substituted-21,21-diphenyl-Δ⁸,²⁰-eburicadienes (Compounds DD) which are also new final products of this invention.

Similarly, as is true in the case of the processing of further derivatives of eburicoic acid, new additional final products of this invention are obtained when the derivatives of tumulosic acid are likewise processed according to the invention. The results obtained from this further processing may be represented by the following equations, wherein R, R' and R" are as hereinbefore defined:

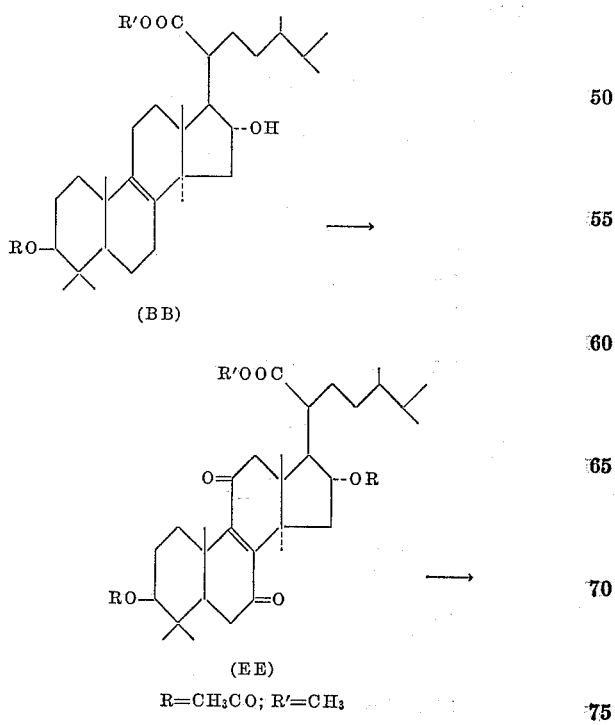

(BB)

(EE)
R=CH₃CO; R'=CH₃

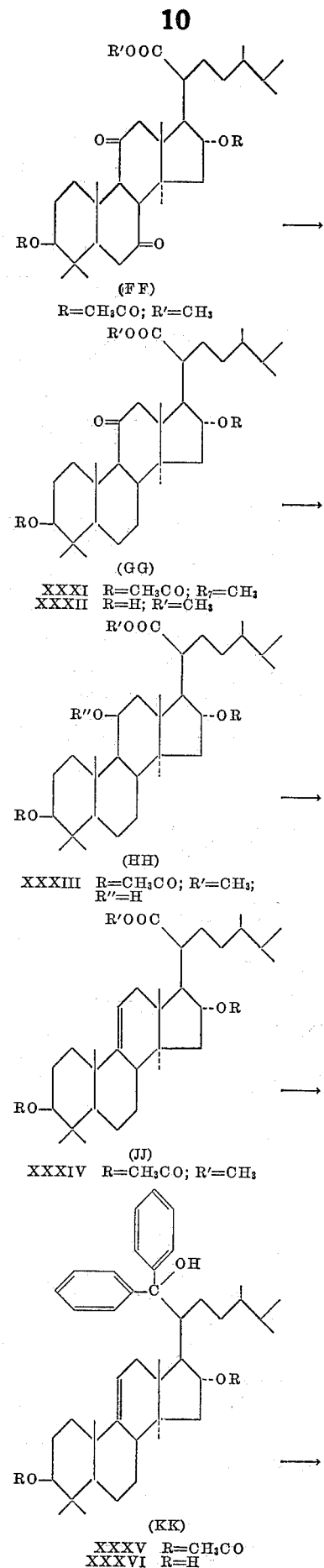

(FF)
R=CH₃CO; R'=CH₃

(GG)
XXXI R=CH₃CO; R'=CH₃
XXXII R=H; R'=CH₃

(HH)
XXXIII R=CH₃CO; R'=CH₃; R"=H (JJ)
XXXIV R=CH₃CO; R'=CH₃

(KK)
XXXV R=CH₃CO
XXXVI R=H

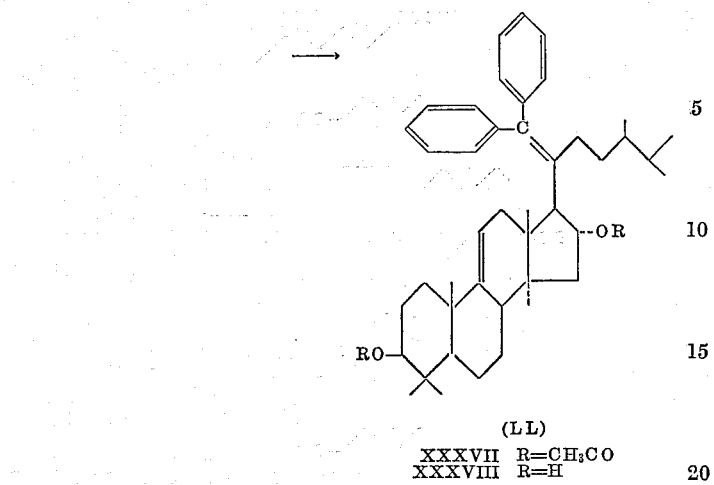

(LL)
XXXVII R=CH₃CO
XXXVIII R=H

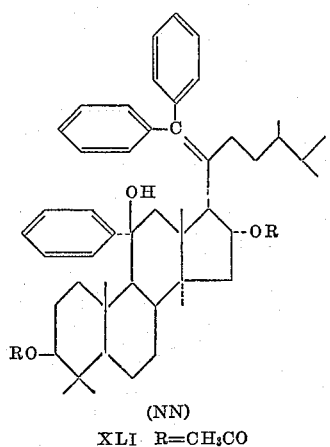

(NN)
XLI R=CH₃CO
XLII R=H

The processing of Compounds BB in accordance with the procedures set forth hereinabove for the processing of Compounds B through K, yields further new products of this invention, those being Compounds KK and LL, corresponding to the products derived from the processing of eburicoic acid, to wit, Compounds K and L.

Still more corresponding new products are produced by further processing the tumulosic acid derivatives, hereinbefore obtained. The results of such further processing may be represented by the following equations wherein R, R' and R'' are as hereinbefore defined:

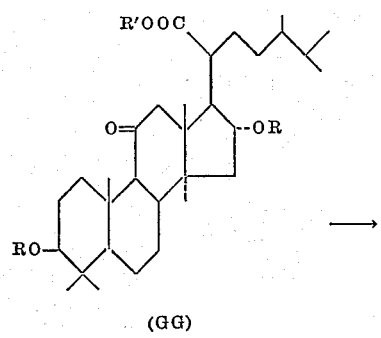

(GG)

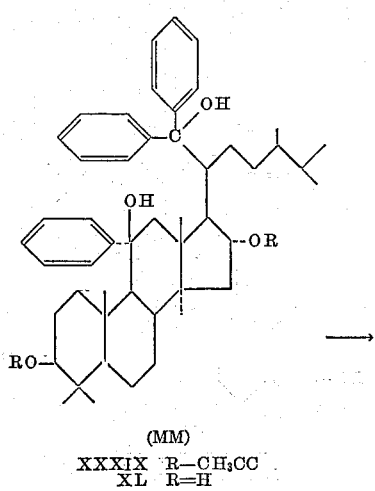

(MM)
XXXIX R=CH₃CO
XL R=H

Thus, treating the tumulosic acid derivatives, Compounds GG, in accordance with the procedures set forth hereinabove, for the treatment of the eburocoic acid derivatives, i.e., Compounds G, additional new products of this invention, i.e., Compounds MM and NN, are obtained.

Even more new products of this invention are obtained if other triterpenoid acids are substituted for the eburicoic acid employed hereinabove. Thus, when Polyporenic Acid C is employed in the process of this invention, results represented by the following equations, wherein R, R' and R'' are as hereinbefore defined, are obtained:

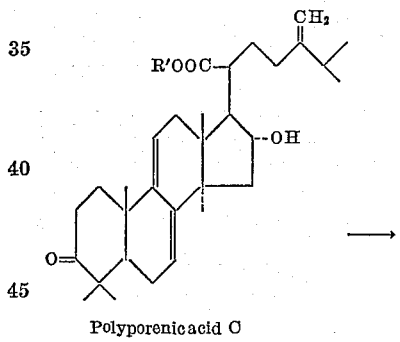

Polyporenic acid C

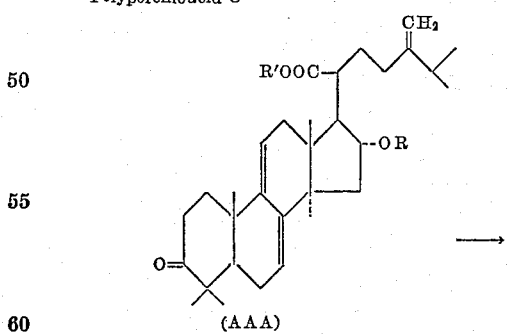

(AAA)
XLIII R=CH₃CO; R'=CH₃

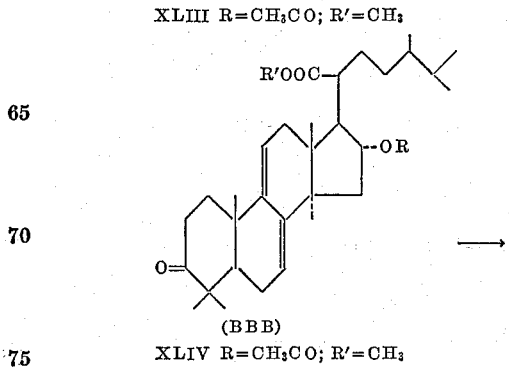

(BBB)
XLIV R=CH₃CO; R'=CH₃

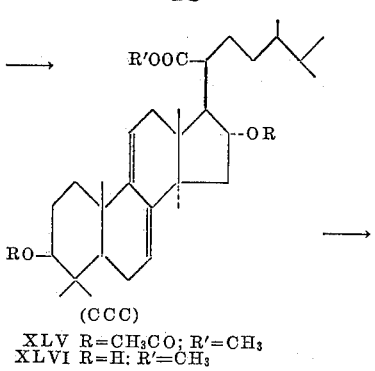

(CCC)
XLV  R=CH₃CO; R'=CH₃
XLVI R=H; R'=CH₃

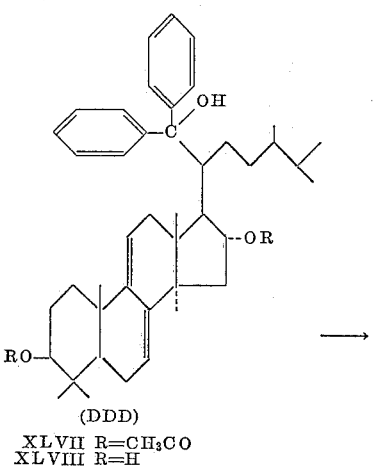

(DDD)
XLVII  R=CH₃CO
XLVIII R=H

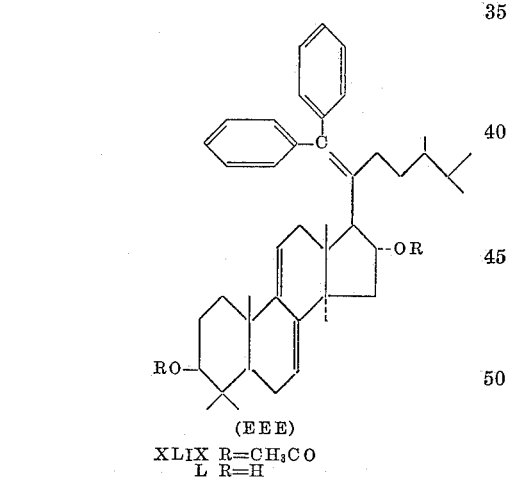

(EEE)
XLIX R=CH₃CO
L    R=H

Polyporenic Acid C is first converted to a corresponding 16-ester of 16α-hydroxy-3-keto-Δ$^{7,9(11)}$-eburicadiene-21-oic acid (Compounds AAA) in the same manner as hereinbefore described in the treatment of the corresponding eburicoic acid.

Compounds AAA are then converted to the corresponding 21-ester of 16α-acetoxy-3-keto-Δ$^{7,9(11)}$-eburicadiene-21-oic acid (Compounds BBB). Compounds BBB are then reduced as by treatment with sodium borohydride and alcohol to yield the 3,16-dihydroxy-Δ$^{7,9(11)}$-eburicadiene-21-oic acids (Compounds CCC). The 3,16-diacetyl-Δ$^{7,9(11)}$-eburicadienes are obtained by acetylating Compounds CCC as by treatment with acetic anhydride in pyridine at room temperature.

Compounds CCC are then treated with phenyl lithium under a nitrogen blanket at elevated temperatures to yield the 21,21-diphenyl-Δ$^{7,9(11)}$-eburicadienes (Compounds DDD) which are new compounds of this invention.

Compounds DDD are then dehydrated as by treatment with glacial acetic acid at elevated temperatures to yield the 21,21-diphenyl-Δ$^{7,9(11),20}$-eburicatrienes (Compounds EEE) which are additional new final products of this invention.

The following examples are illustrative of this invention (all temperatures being in centigrade):

EXAMPLE 1

Acetyl-Eburicoic Acid (I)

To a cooled solution of 500 g. of eburicoic acid in 2.37 liters of pyridine 700 ml. of acetic anhydride is added and the mixture allowed to stand overnight at room temperature. The excess acetic anhydride is decomposed by the addition of ice followed by 4 liters of water. The precipitate of crude acetyl-eburicoic acid is collected and dissolved in 4 liters of chloroform. The chloroform solution is washed with 5% hydrochloric acid, water and 5% potassium bicarbonate solution and the solution is then concentrated to two liters. After the addition of 2 liters of methanol, the solution is reconcentrated to a volume of 2 liters and treated with decolorizing charcoal. The solution is then concentrated and 419 g. of the acetyl-eburicoic acid (I) having a melting point of 240–244°, is collected.

Following the procedure set forth in Example 1, but substituting propionic anhydride for acetic anhydride, yields propionyl eburicoic acid.

Similarly, by substituting other acid anhydrides or acyl halides for the propionic anhydride in the procedure of Example 1, the corresponding 3-esters are formed. Thus, butyric anhydride and benzoyl chloride yield butyryl eburicoic acid and benzoyl eburicoic acid.

EXAMPLE 2

3,16-Diacetyl-Tumulosic Acid

Following the procedure of Example 1, but substituting tumulosic acid for the eburicoic acid, 3,16-diacetyl tumulosic acid, M.P. 227–228°, is obtained.

EXAMPLE 3

Acetyl-Polyporenic Acid C

Following the procedure of Example 1 but substituting polyporenic acid C for the eburicoic acid, acetyl-polyporenic acid C, M.P. 206–210°, is obtained.

EXAMPLE 4

Methyl-Acetyl Eburicoate (II)

To a suspension of 20 g. of acetyl eburicoic acid (I) in 500 ml. of ether is added a solution of diazomethane in ether. The insoluble portion of the acid dissolves as the reaction proceeds and after solution is complete, diazomethane is added until a yellow color persists. The excess diazomethane decomposed with acetic acid, the solvent evaporated and the residue dried under high vacuum. The crude methyl ester on recrystallization from methanol-chloroform gives a first crop of 15.40 g. methyl-acetyl eburicoate (II), M.P. 153–154°, and a second crop of 2.84 g., M.P. 150–151°.

$\lambda_{max}^{Nujol}$ 5.78, 6.10, 8.01, 11.32μ

EXAMPLE 5

Methyl-3,16-Diacetyl Tumulosate (XXII)

Following the procedure of Example 4 but substituting 3,16-diacetyl-tumulosic acid for the acetyl eburicoic acid, methyl-3,16-diacetyl tumulosate (XXII), M.P. 159–159.5°, is obtained.

EXAMPLE 6

Methyl Acetyl-Polyporenate C (XLIII)

Following the procedure of Example 4 but substituting acetyl polyporenic acid C for acetyl eburicoic acid yields methyl acetyl-polyporenate C (XLIII), M.P. 122–124°.

EXAMPLE 7

*Methyl 3-Acetyl-Δ⁸-Eburicene-3β-Ol-21-Oate (IV)*

A solution of 85.0 g. of methyl 3-acetyl eburicoate (II) in 1.7 liters of ethyl acetate, absorbs 1 equivalent of hydrogen when shaken in an atmosphere of hydrogen at room temperature and pressure in the presence of 5.1 g. of Adams catalyst. The catalyst is removed by filtration, the solvent evaporated and the residue is recrystallized from methanol-chloroform to give a first crop of 69.8 g. of methyl 3-acetyl-Δ⁸-eburicene-3β-ol-21-oate (IV), M.P. 156–159°, and a second crop of 8.5 g., M.P. 153–154°.

$\lambda_{max.}^{Nujol}$ 5.78, and 8.02μ

EXAMPLE 8

*Methyl 3,16-Diacetyl-Δ⁸-Eburicene-3β,16α-Diol-21-Oate (XXIII)*

Following the procedure of Example 7 but substituting methyl-3,16-diacetyl tumulosate (XXII) for methyl-3-acetyl eburicoate (II), methyl 3,16-diacetyl-Δ⁸-eburicene-3β,16α-diol-21-oate, M.P., 183–184°, (XXIII) is obtained.

EXAMPLE 9

*Methyl 16-Acetyl-Δ⁷,⁹⁽¹¹⁾-Eburicadiene-16α-Ol-3-One-21-Oate (XLIV)*

Following the procedure of Example 7 but substituting methyl acetyl polyporenate (XLIII) for methyl acetyl eburicoate, yields methyl 16-acetyl-Δ⁷,⁹⁽¹¹⁾-eburicadiene-16α-ol-3-one-21-oate (XLIV), M.P. 139–141°.

EXAMPLE 10

*Methyl 3-Acetyl-Δ⁸-Eburicene-3β-ol-7,11-Dione 21-Oate (IX)*

A solution of 40 g. of chromic acid in 470 ml. of glacial acetic acid and 30 ml. of water is added to 52.8 g. of methyl 3-acetyl-Δ⁸-eburicene-3β-ol-21-oate (IV) in 2.5 liters of glacial acetic acid, over a period of one hour, during which the temperature of the mixture is maintained at 75°. The temperature of the mixture is maintained at 75° for an additional hour, at which time the excess chromic acid is decomposed by the addition of 45 ml. of methanol. The reaction mixture is concentrated on the rotary evaporator to approximately 200 ml. and after dilution with 400 ml. of water is extracted with chloroform. The chloroform solution is washed with saturated aqueous sodium chloride, 5% potassium bicarbonate and saturated aqueous sodium chloride and evaporated to dryness. The resultant crude orange semicrystalline product is dissolved in 100 ml. of hexane and 500 ml. of methanol and the solution is concentrated until discernible crystallization commences. Orange, impure Δ⁸-eburicene-7,11-dione (IX) is collected and redissolved in 200 ml. of benzene. 54 g. neutral alumina is added to the benzene solution and after swirling for 5 minutes is removed by filtration. The alumina is washed with 500 ml. of benzene and the combined filtrates evaporated to yield 26.50 g. of a yellow crystalline material. Recrystallization from methanol gives 19.961 g. of the Δ⁸-eburicene-7,11-dione (IX), M.P. 172–173°;

$\lambda_{max.}^{EtOH}$ 270 mμ (ε=8,600)

and a second crop of 3.763 g., M.P. 167–168°;

$\lambda_{max.}^{Nujol}$ 5.76μ, 5.90μ (sh), 5.94μ

EXAMPLE 11

*Methyl 3,16-Diacetyl-Δ⁸-Eburicene-3β,16α-Diol-7,11-Dione-21-Oate (XXIX)*

Following the procedures set forth in Example 10 but substituting methyl 3,16-diacetyl-Δ⁸-eburicene-3β,16α-diol-21-oate (XXIII), for methyl-3-acetyl-Δ⁸-eburicene-3β-ol-21-oate, yields methyl 3,16-diacetyl-Δ⁸-eburicene-3β,16α-diol-7,11-dione-21-oate (XXIX).

EXAMPLE 12

*Methyl 3-Acetyl-Eburicane-3β-Ol-7,11-Dione-21-Oate (X)*

A solution of 55.6 g. of methyl 3-acetyl-Δ-eburicene-3β-ol-7,11-dione-21-oate (IX) in 1.5 liters of glacial acetic acid is heated to reflux and 275 g. of granulated zinc (30 mesh) is added over a period of 15 minutes. After an additional 30 minutes, 75 g. of zinc dust is added. Heating of the mixture is continued until the total reflux time from the start of the first addition equals 60 minutes. The solution is cooled and filtered and the acetic acid is evaporated in vacuo. Recrystallization from methanol-chloroform gives a first crop of 27.13 g. of methyl 3-acetyl-eburicane-3β-ol-7,11-dione-21-oate (X), M.P. 192–193°; a second crop of 19.22 g. of (X), M.P. 191–192°; and a third crop of 2.16 g. of (X), M.P. 188–189°;

$\lambda_{max.}^{Nujol}$ 5.74, 5.83, 5.88μ

EXAMPLE 13

*Methyl 3,16-Diacetyl-Eburicane-3β,16α-Diol-7,11-Dione-21-Oate (XXX)*

Following the procedure set forth in Example 12 but substituting methyl 3,16-diacetyl-Δ⁸-eburicene-3β,16α-diol-7,11-dione 21-oate (XXIX), for methyl-3-acetyl-Δ⁸-eburicene-3β-ol-7,11-dione 21-oate, yields methyl 3,16-diacetyl-eburicane-3β,16α-diol-7,11-dione-21-oate (XXX).

EXAMPLE 14

*Methyl 3-Acetyl Eburicane-3β-Ol-11-One-21-Oate (XI)*

A solution of 150 mg. of methyl 3-acetyl-eburicane-3β-ol-7,11-dione-21-oate (X) in 25 ml. of diethylene glycol containing 0.5 ml. of 85% hydrazine hydrate is heated at reflux for 2 hours. After cooling, 3 g. of potassium hydroxide in 5 ml. of diethylene glycol is added and the temperature of the solution is raised to 195° by distilling off water and hydrazine. The temperature of the solution is maintained at 195° for 4 hours, after which it is cooled. The cooled reaction mixture is poured into 100 ml. of 3 N hydrochloric acid and extracted with ether and chloroform The combined organic layer is washed with water, dried over sodium sulfate and evaporated. The crude product is reacetylated with acetic anhydride in pyridine at room temperature, remethylated by treatment with ethereal diazomethane and then chromatographed on 4 g. of neutral alumina. The benzene-chloroform eluates are recrystallized from methanol to give 9 mg. of methyl 3-acetyl-eburicane-3β-ol-11-one-21-oate (XI), M.P. 155–156°.

$\lambda_{max.}^{Nujol}$ 5.80, 5.86μ

*Analysis.*—Calcd. for $C_{34}H_{56}O_5$: C, 74.95; H, 10.36. Found: C, 74.54; H, 10.17.

EXAMPLE 15

*Methyl 3,16-Diacetyl-Eburicane-3β,16α-Diol-11-One-21-Oate (XXXI)*

Following the procedure set forth in Example 14, but substituting methyl 3,16-diacetyl-eburicane-3β,16α-diol-7,11-dione-21-oate (XXX), for methyl 3-acetyl-eburicane-3β-ol-7,11-dione-21-oate, yields methyl 3,16-diacetyl-eburicane-3β,16α-diol-11-one-21-oate (XXXI).

EXAMPLE 16

*Methyl 3-Acetyl-Eburicane-3β,11β-Diol-21-Oate (XIII)*

A solution of 100 mg. of methyl 3-acetyl-eburicane-3β-ol-11-one-21-oate (XI) in 10 ml. of dry tetrahydrofuran is added to 200 mg. of lithium borohydride in 15 ml. of tetrahydrofuran and is left at room temperature for 2 hours. The excess lithium borohydride is decomposed by the addition of 10 ml. of 10% aqueous acetic acid. The tetrahydrofuran is evaporated, the residue extracted.

Three recrystallizations from methanol yields 39 mg. of analytically pure methyl 3-acetyl-eburicane-3β,11β-diol-21-oate (XIII) having the following properties: M.P. 203.5–204°; $[\alpha]_D^{20}$ +54.8° (chlf. C., 2.07);

$\lambda_{max.}^{Nujol}$ 2.85, 5.78, 5.80μ

*Analysis.*—Calcd. for $C_{34}H_{58}O_5$: C, 74.68; H, 10.69; $OCH_3$, 5.67. Found: C, 74.64; H, 10.21; $OCH_3$, 5.01.

EXAMPLE 17

*Methyl 3,16-Diacetyl-Eburicane-3β,11β,16α-Triol-21-Oate (XXXIII)*

Following the procedure set forth in Example 16 but substituting methyl 3,16-diacetyl-eburicane-3β,16α-diol-11-one-21-oate (XXXI) for methyl 3-acetyl-eburicane-3β-ol-11-one-21-oate yields methyl 3,16-diacetyl-eburicane-3β,11β,16α-triol-21-oate (XXXIII).

EXAMPLE 18

*Methyl 3-Acetyl-$\Delta^{9(11)}$-Eburicane-3β-Ol-21-Oate (XIV)*

To a solution of 15 mg. of methyl 3-acetyl-eburicane-3β,11β-diol-21-oate (XIII) in 1 ml. of dimethylformamide is added 0.1 ml. of pyridine and 0.05 ml. of methanesulfonyl chloride and the mixture is held at room temperature for 18 hours. Water is added and the reaction mixture is extracted with chloroform. The chloroform layer is washed with water, dried over magnesium sulfate and evaporated. Recrystallization of the crude product from methanol yields 8 mg. of analytically pure methyl 3-acetyl-$\Delta^{9(11)}$-eburicene-3β-ol-21-oate (XIV) having the following properties: M.P. 154–155° $[\alpha]_D^{21}$ +62.0° (chlf. C., 0.66); and a second crop of 4 mg. of (XV) having an M.P. of 150–152°.

$\lambda_{max.}^{Nujol}$ 5.81, 8.05μ

*Analysis.*—Calcd. for $C_{34}H_{56}O_4$: C, 77.22; H, 10.67. Found: C, 77.52; H, 10.93.

EXAMPLE 19

*Methyl 3,16-Diacetyl-$\Delta^{9(11)}$-Eburicene-3β,16α-Diol-21-Oate (XXXIV)*

Following the procedure set forth in Example 18 but substituting methyl 3,16-diacetyl-eburicane-3β,11β,16α-triol-21-oate (XXXIII) for methyl 3-acetyl-eburicane-3β,11β-diol-21-oate yields methyl 3,16-diacetyl-$\Delta^{9(11)}$-eburicene-3β,16α-diol-21-oate (XXXIV).

EXAMPLE 20

*Methyl $\Delta^8$-Eburicene-3β-Ol-21-Oate (III)*

A solution of 500 mg. of methyl 3-acetyl-$\Delta^8$-eburicene 3β-ol-21-oate (IV) in 200 ml. of 1 N ethanolic potassium hydroxide is allowed to stand at room temperature for 16 hours. The solution is then neutralized with 20% sulfuric acid and the solids filtered. The filtrate is diluted with water and the ethanol evaporated. The resulting solids are combined with the previously collected material and partitioned between ether and water. The ether layer is washed with water and evaporated to give 484 mg. of methyl $\Delta^8$-eburicene-3β-ol-21-oate (V), which is then recrystallized from methanol to yield 284 mg. of crystalline material having a melting point of 139–144°;

$\lambda_{max.}^{Nujol}$ 2.95–3.00, 5.78μ

EXAMPLE 21

*Methyl $\Delta^8$-Eburicene-3β,16α-Diol-21-Oate (XXIV)*

Following the procedure of Example 20, but substituting methyl 3,16-diacetyl-$\Delta^8$-eburicene-3β,16α-diol-21-oate (XXIII) for methyl 3-acetyl-$\Delta^8$-eburicene-3β-ol-21-oate, yields methyl $\Delta^8$-eburicene-3β,16α-diol-21-oate (XXIV).

EXAMPLE 22

*Methyl $\Delta^{7,9(11)}$-Eburicadiene-16α-Ol-3-One-21-Oate*

Following the procedure set forth in Example 20, but substituting methyl 16-acetyl-$\Delta^{7,9(11)}$-eburicadiene-16α-ol-3-one-21-oate (XLIV) for methyl 3-acetyl-$\Delta^8$-eburicene-3β-ol-21-oate (IV) yields methyl $\Delta^{7,9(11)}$-eburicadiene-16α-ol-3-one-21-oate.

EXAMPLE 23

*Methyl $\Delta^{7,9(11)}$-Eburicadiene-3β,16α-Diol-21-Oate (XLVI)*

A solution of methyl $\Delta^{7,9(11)}$-eburicadiene-16α-ol-3-one-21-oate in dioxane, is treated with sodium borohydride in aqueous dioxane for one hour at room temperature. Acidification of the mixture with 5% hydrochloric acid and extraction with ether yields a crude product, which after recrystallization from methanol-chloroform, gives methyl $\Delta^{7,9(11)}$-eburicadiene-3β,16α-diol-21-oate (XLVI).

EXAMPLE 24

*Methyl 3,16-Diacetyl-$\Delta^{7,9(11)}$-Eburicadiene-3β,16α-Diol-21-Oate (XLV)*

Methyl $\Delta^{7,9(11)}$-eburicadiene-3β,16α-diol-21-oate (XLIV) is treated with a solution of acetic anhydride in pyridine containing 2.1 mole equivalents of acetic anhydride at room temperature for eighteen hours. The reagents are evaporated in vacuo and the crystalline residue is recrystallized from methanol. After two crystallizations, methyl 3,16-diacetyl-$\Delta^{7,9(11)}$-eburicadiene-3β,16α-diol-21-oate (XLV) is obtained.

EXAMPLE 25

*21,21-Diphenyl-$\Delta^8$-Eburicene-3β,21-Diol (V)*

A solution of 3 mmole of phenyl lithium in 3 ml. of ether is added to a solution of 243 mg. of methyl $\Delta^8$-eburicene-3β-ol-21-oate (III) (0.5 mmole) in 20 ml. of dry benzene. The mixture is heated at reflux under nitrogen for 18 hours, during which time a copious precipitate develops. The cooled reaction mixture is then acidified with 5 ml. of 20% sulfuric acid, and the aqueous layer separated and washed with benzene. The combined organic solution is washed with water until neutral, dried over magnesium sulfate and evaporated to give 378 mg. of crude 21,21-diphenyl-$\Delta^8$-eburicene-3β,21-diol (V).

EXAMPLE 26

*21,21-Diphenyl-$\Delta^8$-Eburicene-3β,16α,21-Triol (XXVI)*

Following the procedure set forth in Example 25, but substituting methyl $\Delta^8$-eburicene-3β,16α-diol-21-oate (XXIV) for the methyl $\Delta^8$-eburicene-3β-ol-21-oate (III) yields 21,21-diphenyl-$\Delta^8$-eburicene-3β,16α,21-triol (XXVI).

EXAMPLE 27

*21,21-Diphenyl-$\Delta^{7,9(11)}$-Eburicadiene-3β,16α,21-Triol (XLVIII)*

Following the procedure set forth in Example 25 but substituting methyl $\Delta^{7,9(11)}$-eburicadiene-3β,16α-diol-21-oate (XLVI) for methyl $\Delta^8$-eburicene-3β-ol-21-oate (III) yields 21,21-diphenyl-$\Delta^{7,9(11)}$-eburicadiene-3β,16α,21-triol (XLVIII).

EXAMPLE 28

*21,21-Diphenyl-$\Delta^{8,20}$-Eburicadiene-3β-Ol (VII)*

The 21,21-diphenyl-$\Delta^8$-eburicene-3β,21-diol (V) obtained in Example 25 is dehydrated by the addition or 5 ml. of glacial acetic acid and is heated at reflux for one hour to yield the crude 21,21-diphenyl-$\Delta^{8,20}$-eburicadiene-3β-ol (VII).

EXAMPLE 29

*21,21-Diphenyl-$\Delta^{8,20}$-Eburicadiene-3β,16α-Diol (XXVII)*

Following the procedure set forth in Example 28 but substituting 21,21-diphenyl-$\Delta^8$-eburicene-3β,16α,21-triol (XXVI) for 21,21-diphenyl-$\Delta^8$-eburicene-3β,21-diol (V) yields 21,21-diphenyl-$\Delta^{8,20}$-eburicadiene-3β,16α-diol (XXVII).

EXAMPLE 30

*21,21-Diphenyl-$\Delta^{7,9(11),20}$-Eburicatriene-3β,16α-Diol (L)*

Following the procedure set forth in Example 28 but substituting 21,21-diphenyl-$\Delta^{7,9(11)}$ - eburicadiene - 3β,16α, 21-triol (XLVIII) for 21,21-diphenyl-$\Delta^8$-eburicene-3β,21-diol (VII), yields 21,21-diphenyl-$\Delta^{7,9(11),20}$-eburicatriene-3β,16α-diol (L).

EXAMPLE 31

*3-Acetyl-21,21-Diphenyl-$\Delta^{8,20}$-Eburicadiene-3β-Ol (VIII)*

The 21,21-diphenyl-$\Delta^{8,20}$-eburicadiene-3β-ol (VII) obtained in Example 28 is acetylated by treatment with pyridine and acetic anhydride at room temperature to give 345 mg. of crude 3-acetyl-21,21-diphenyl-$\Delta^{8,20}$-eburicadiene-3β-ol (VIII), which is chromatographed on 15 g. of neutral alumina. Fractions 33–50 (hexane-benzene, 1:1 and benzene) yield on recrystallization from methanol, 59 mg. of 3-acetyl-21,21-diphenyl-$\Delta^{8,20}$-eburicadiene-3β-ol (VIII), M.P. 183–185°;

$$\lambda_{max.}^{EtOH} \; 248 \; m\mu \; (\epsilon = 12{,}500)$$

Fractions 51–66 (benzene) give on recrystallization 31 mg. of 3-acetyl-21,21-diphenyl-$\Delta^{8,20}$-eburicadiene - 3β - ol (VIII), M.P. 178–180°.

The sample recrystallized for analysis has M.P. 189–190°.

$\lambda_{max}^{KBr}$ 5.14μ, 5.35μ, 5.55μ (weak), 5.75μ, 6.24μ, 13.18μ, 14.27μ

*Analysis.*—Calcd. for $C_{45}H_{62}O_2$: C, 85.12; H, 9.84. Found: C, 84.37, 84.41; H, 9.55, 9.11.

EXAMPLE 32

*3,16-Diacetyl-21,21-Diphenyl-$\Delta^{8,20}$-Eburicadiene-3β,16α-Diol (XXVIII)*

Following the procedure set forth in Example 31, but substituting the 21,21-diphenyl-$\Delta^{8,20}$-eburicadiene-3β,16α-diol obtained in Example 29 for 21,21-diphenyl-$\Delta^{8,20}$-eburicadiene-3β-ol (VII) yields 3,16-diacetyl-21,21-diphenyl-$\Delta^{8,20}$-eburicadiene-3β,16α-diol (XXVIII).

EXAMPLE 33

*3,16-Diacetyl-21,21-Diphenyl-$\Delta^{7,9(11),20}$-Eburicatriene-3β,16α-Diol (XLIX)*

Following the procedure set forth in Example 31, but substituting the 21,21-diphenyl-$\Delta^{7,9(11),20}$-eburicatriene-3β,16α-diol, obtained in Example 30 for 21,21-diphenyl-$\Delta^{8,20}$-eburicadiene-3β-ol (VII) yields 3,16-diacetyl-21,21-diphenyl-$\Delta^{7,9(11),20}$-eburicatriene-3β,16α-diol (XLIX).

EXAMPLE 34

*3-Acetyl-21,21-Diphenyl-$\Delta^8$-Eburicene-3β,21-Diol (VI)*

A solution of 15 ml. of phenyl lithium in ether (6.0 mmole) is added to 528 mg. of methyl 3-acetyl-$\Delta^8$-eburicene-3β-ol-21-oate (III) (1 mmole) in 40 ml. of dry benzene. After 3 hours at room temperature, the reaction mixture is acidified with 20 ml. of 5% hydrochloric acid and 20 ml. of ether is added. The organic layer is separated, washed with 5% hydrochloric acid and water and evaporated. The residue is then acetylated by treatment with pyridine and acetic anhydride at room temperature to give 979 mg. of crude 3-acetyl-21,21-diphenyl-$\Delta^8$-eburicene-3β,21-diol (VI).

EXAMPLE 35

*3,16-Diacetyl-21,21-Diphenyl-$\Delta^8$-Eburicene-3β,16α,21-Triol (XXV)*

Following the procedure set forth in Example 34, but substituting methyl 3,16-diacetyl-$\Delta^8$-eburicene-3β,16α-diol-21-oate (XXIII) for the methyl 3-acetyl-$\Delta^8$-eburicene-3β-ol-21-oate (III), yields 3,16-diacetyl-21,21-diphenyl-$\Delta^8$-eburicene-3β,16α,21-triol (XXV).

EXAMPLE 36

*3,16-Diacetyl-21,21-Diphenyl-$\Delta^{7,9(11)}$-Eburicadiene-3β,16α,21-Triol (XLVII)*

Following the procedure set forth in Example 34, but substituting methyl-3,16-diacetyl-$\Delta^{7,9(11)}$-eburicadiene - 3β, 16α-diol-21-oate (XLV) for methyl 3-acetyl-$\Delta^8$-eburicene-3β-ol-21-oate (III) yields 3,16-diacetyl-21,21-diphenyl-$\Delta^{7,9(11)}$-eburicadiene-3β,16α-21-triol (XLVII).

EXAMPLE 37

*3-Acetyl-21,21-Diphenyl-$\Delta^{8,20}$-Eburicadiene-3β-Ol (VIII)*

492 mg. of 3-acetyl-21,21-diphenyl-$\Delta^8$-eburicene-3β,21-diol (VI) obtained in Example 34 is dissolved in benzene containing a few crystals of iodine and dehydrated by distillation of benzene. After 50 ml. of distillate are collected, the remaining solution is washed with sodium thiosulfate solution and water, and evaporated to give 444 mg. of 3-acetyl-21,21-diphenyl-$\Delta^{8,20}$-eburicadiene-3β-ol (VIII). Chromatography on 27 g. of neutral alumina and elution with benzene gives, after recrystallization from methanol, 81 mg. of 3-acetyl-21,21-diphenyl-$\Delta^{8,20}$-eburicadiene-3β-ol (VIII), M.P. 186–188°;

$$\lambda_{max.}^{EtOH} \; 248 \; m\mu \; (\epsilon = 12{,}600)$$

EXAMPLE 38

*3-Acetyl-21,21-Diphenyl-$\Delta^{8,20}$-Eburicadiene-3β-Ol (VIII)*

468 mg. of crude 3-acetyl-21,21-diphenyl-$\Delta^8$-eburicene-3β,21-diol (VI) obtained in Example 34 is dehydrated by refluxing a solution in 5 ml. of glacial acetic acid for 1 hour. After evaporation of the acetic acid, the residue is chromatographed on 27 g. of neutral alumina. Elution with hexane-benzene (1:1) yields after recrystallization from methanol 43 mg. of 3-acetyl-21,21-diphenyl-$\Delta^{8,20}$-eburicadiene-3β-ol (VIII), M.P. 178–182°.

EXAMPLE 39

*3-Acetyl-21,21-Diphenyl-$\Delta^{9(11),20}$-Eburicadiene-3β-Ol (XVII)*

A solution of 10 ml. of phenyl lithium in ether (4.2 mmole) is added to 329 mg. of methyl 3-acetyl-eburicane-3β,11β-diol-21-oate (XIII) (0.6 mmole) in 25 ml. of dry benzene and is left at room temperature for 3 hours. After addition of 20 ml. of 5% hydrochloric acid, the organic phase is separated, washed with water and evaporated.

The residue is heated at reflux with 5 ml. of glacial acetic acid for 1 hour in order to dehydrate and then is reacetylated by treatment with pyridine and acetic anhydride at room temperature to give 425 mg. of crude 3-acetyl-21,21-diphenyl-$\Delta^{9(11),20}$-eburicadiene-3β-ol (XVII). Chromatography of the crude product on 25 g. of neutral alumina, elution with benzene and recrystallization from methanol yields 149 mg. of 3-acetyl-21,21-diphenyl-$\Delta^{9(11),20}$-eburicadiene-3β-ol (XVII), M.P. 179–182° and 26 mg. of (XVII), M.P. 176–177°.

The analytical sample melts at 182–183°;

$$\lambda_{max.}^{EtOH} \; 247 \; m\mu \; (\epsilon = 13{,}400)$$

*Analysis.*—Calcd. for $C_{45}H_{62}O_2$: C, 85.12; H, 9.84. Found: C, 84.98; H, 9.71.

EXAMPLE 40

*3,16-Diacetyl-21,21-Diphenyl-$\Delta^{9(11),20}$-Eburicadiene-3β,16α-Diol (XXXVII)*

Following the procedure set forth in Example 39, but substituting methyl - 3,16-diacetyl-eburicane-3β,11β,16α-triol-21-oate (XXXIII) for methyl 3-acetyl-eburicane-3β,11β-diol-21-oate (XIII) yields 3,16-diacetyl-21,21-diphenyl-$\Delta^{9(11),20}$-eburicadiene-3β,16α-diol (XXXVII).

EXAMPLE 41

*3-Acetyl-21,21-Diphenyl-$\Delta^{9(11),20}$-Eburicadiene-3β-ol (XVII)*

A solution of 10 ml. of phenyl lithium in ether (4.2 mmole) is added to 300 mg. of methyl 3-acetyl-eburicane-3β,11β-diol-21-oate (XIII) in 25 ml. of dry benzene and is left at room temperature for 3 hours. After addition of 20 ml. of 5% hydrochloric acid, the organic phase is separated, washed with water and evaporated.

The residue is then reacetylated with pyridine and acetic anhydride at room temperature and is treated in accordance with the procedure set forth in Example 37 to yield 52 mg. of 3-acetyl-21,21-diphenyl-$\Delta^{9(11),20}$-eburicadiene-3β-ol (XVII), M.P. 183–184°;

$\lambda_{max.}^{Nujol}$ 5.14μ, 5.34μ, 5.54μ, 5.79μ, 6.26μ, 13.15–14.19μ

EXAMPLE 42

*21,21-Diphenyl-$\Delta^{9(11)}$-Eburicene-3β,21-Diol (XV)*

A solution of 264 mg. of methyl 3-acetyl-$\Delta^{9(11)}$-eburicene-3β-ol-21-oate (XIV) (0.5 mmole) in 20 ml. of dry benzene containing 6.2 ml. of phenyl lithium in ether (2.5 mmole) is kept at room temperature for 3 hours. After addition of 20 ml. of 5% hydrochloric acid and separation of the organic layer, the aqueous layer is extracted with ether and the combined organic layers washed with water and evaporated, to yield the crude 21,21-diphenyl-$\Delta^{9(11)}$-eburicene-3β,21-diol (XV).

EXAMPLE 43

*21,21-Diphenyl-$\Delta^{9(11)}$-Eburicene-3β,16α,21-Triol (XXXVI)*

Following the procedure set forth in Example 42 but substituting methyl 3,16-diacetyl-$\Delta^{9(11)}$-eburicene-3α,16α-diol-21-oate (XXXIV) for methyl 3-acetyl-$\Delta^{9(11)}$-eburicene-3β-ol-21-oate (XIV) yields 21,21-diphenyl-$\Delta^{9(11)}$-eburicene-3β,16α,21-triol (XXXVI).

EXAMPLE 44

*3-Acetyl-21,21-Diphenyl-$\Delta^{9(11),20}$-Eburicadiene-3β-ol (XVII)*

The 21,21-diphenyl-$\Delta^{9(11)}$-eburicene-3β,21-diol (XV) obtained in Example 42 is acetylated by treatment with pyridine and acetic anhydride at room temperature and the crude acetylation product obtained is then dehydrated according to the procedures set forth in Example 39 to give 329 mg. of crude 3-acetyl-21,21-diphenyl-$\Delta^{9(11),20}$-eburicadiene-3β-ol (XVII). Chromatography on 20 g. of neutral alumina, elution with benzene and recrystallization from methanol yields 110 mg. of 3-acetyl-21,21-diphenyl-$\Delta^{9(11),20}$-eburicadiene-3β-ol (XVII), M.P. 180–181° (softening at 175°);

$\lambda_{max.}^{EtOH}$ 248 mμ (ε=14,300)

and a second crop of 8 mg. of XVII, M.P. 175–178°.

EXAMPLE 45

*3,16-Diacetyl-21,21-Diphenyl-$\Delta^{9(11),20}$-Eburicadiene-3β,16α-Diol (XXXVII)*

Following the procedure set forth in Example 44 but substituting the 21,21-diphenyl-$\Delta^{9(11)}$-eburicene-3β,16α,21-triol (XXXVI) obtained in Example 42 for 21,21-diphenyl-$\Delta^{9(11)}$-eburicene-3β,21-diol (XV), yields 3,16-diacetyl - 21,21 - diphenyl-$\Delta^{9(11),20}$-eburicadiene-3β,16α-diol (XXXVII).

EXAMPLE 46

*Methyl Eburicane-3β-Ol-11-One-21-Oate (XII)*

A solution of 2.0 g. of methyl 3-acetyl-eburicane-3β-ol-11-one-21-oate (XI) in 400 ml. of 1 N ethanolic potassium hydroxide is allowed to stand at room temperature for 18 hours. The solution is then neutralized with 20% sulfuric acid, diluted with water and the ethanol evaporated. The aqueous suspension is then extracted with ether and the ether solution washed with water, dried over magnesium sulfate and evaporated. Recrystallization from methanol yields 1.55 g. of methyl eburicane-3β-ol-11-one-21-oate (XII), M.P. 133–135°. The analytical samples melt at 137–139°;

$\lambda_{max.}^{Nujol}$ 2.97, 5.77, 5.89μ

*Analysis.*—Calcd. for $C_{32}H_{54}O_4$: C, 76.44; H, 10.83. Found: C, 76.14; H, 10.63.

EXAMPLE 47

*Methyl Eburicane-3β,16α-Diol-11-One-21-Oate (XXXII)*

Following the procedure set forth in Example 46, but substituting methyl 3,16-diacetyl-eburicane-3β,16α-diol-11-one-21-oate (XXXI), for methyl 3-acetyl-eburicane-3β-ol-11-one-21-oate, yields methyl eburicane-3β,16α-diol-11-one-21-oate (XXXII).

EXAMPLE 48

*11,21,21-Triphenyl-Eburicane-3β,11β,21-Triol (XIX)*

A solution of 251 mg. of methyl eburicane-3β-ol-11-one-21-oate (XII), (0.5 mmole) in 25 ml. of dry benzene containing 4 ml. of phenyl lithium in ether (2.0 mmole) is held at room temperature for 20 hours. An additional 4 ml. of phenyl lithium in ether is added and the reaction mixture kept at room temperature for an additional 20 hours. After addition of 25 ml. of 5% hydrochloric acid, the organic layer is separated, washed with water and evaporated to yield the crude 11,21,21-triphenyl-eburicane-3β,11β,21-triol (XIX).

EXAMPLE 49

*11,21,21-Triphenyl-Eburicane-3β,11β,16α,21-Tetraol (XL)*

Following the procedure set forth in Example 48 but substituting methyl eburicane-3β,16α-diol-11-one-21-oate (XXXII) for methyl eburicane-3β-ol-11-one-21-oate (XII) yields 11,21,21-triphenyl-eburicane-3β,11β,16α,21-tetraol (XL).

EXAMPLE 50

*3-Acetyl-11,21,21-Triphenyl-$\Delta^{20}$-Eburicene-3β,11β-Diol (XXI)*

The crude 11,21,21-triphenyl-eburicane-3β,11β,21-triol (XIX), obtained in Example 48, is dehydrated by refluxing with 5 ml. of glacial acetic acid for 1 hour and is followed by acetylation by treatment with pyridine and acetic anhydride at room temperature to give 395 mg. of crude 3 - acetyl-11,21-21-triphenyl-$\Delta^{20}$-eburicene-3β,11β-diol (XXI). Chromatography on 19 g. of neutral alumina, elution with hexane-benzene (4:1 and 1:1) and recrystallization from methanol yields a first crop of 53 mg. of 3 - acetyl-11,21,21-triphenyl-$\Delta^{20}$-eburicene-3β,11β-diol (XXI), M.P. 170.5–173 and a second crop of (XXI), M.P. 169–174°;

$\lambda_{max.}^{Nujol}$ 2.88μ, 5.16μ, 5.35μ, 5.55μ, 5.82μ, 6.26μ, 13.15μ, 13.25μ, 14.25μ

The analytical sample has a M.P. 172.5–173°;

$\lambda_{max.}^{EtOH}$ 237 mμ (ε=10,000)

*Analysis.*—Calcd. for $C_{51}H_{68}O_3$: C, 84.01; H, 9.40. Found: C, 83.97; H, 10.01.

EXAMPLE 51

*3,16-Diacetyl-11,21,21-Triphenyl-$\Delta^{20}$-Eburicene-3β,11β,16α-Triol (XLI)*

Following the procedure set forth in Example 50 but substituting the crude 11,21,21-triphenyl-eburicane-3β,11β,21-tetrol (XL) obtained in Example 48 for 11,21,21-triphenyl-eburicane-3β,11β,21-triol (XIX) yields 3,16-diacetyl - 11,21,21 - triphenyl-$\Delta^{20}$-eburicene - 3β,11β,16α-triol (XLI).

EXAMPLE 52

*11,21,21-Triphenyl-$\Delta^{20}$-Eburicene-3β,11β-Diol (XX)*

Following the procedure set forth in Example 46 but substituting 3-acetyl - 11,21,21-triphenyl-Δ²⁰-eburicene-3β,11β-diol (XXI) for methyl-3-acetyl-eburicane-3β-ol-11-one-21-oate (XII) yields 11,21,21-triphenyl-Δ²⁰-eburicene-3β,11β-diol (XX), a non-crystalline material whose infrared spectrum showed no adsorption in the carbonyl region 5.5–6.0μ.

EXAMPLE 53

*11,21,21-Triphenyl-Δ²⁰-Eburicene-3β,11β,16α-Triol (XLII)*

Following the procedure set forth in Example 46, but substituting 3,16 - diacetyl - 11,21,21 - triphenyl-Δ²⁰-eburicene-3β,11β,16α-triol (XLI) for methyl 3-acetyl-eburicane-3β-ol-11-one-21-oate (XII) yields 11,21,21-triphenyl-Δ²⁰-eburicene-3β,11β,16α-triol (XLII).

EXAMPLE 54

*3-Acetyl-11,21,21-Triphenyl-Eburicane-3β,11β,21-Triol*

Following the procedure of Example 1, but substituting 11,21,21-triphenyl-eburicane - 3β,11β,21 - triol (XIX) for eburicoic acid yields 3-acetyl-11,21,21-triphenyl-eburicane-3β,11β,21-triol.

EXAMPLE 55

*3,16-Diacetyl-11,21,21-Triphenyl-Eburicane-3β,11β,16α,21-Tetraol (XXXIX)*

Following the procedure of Example 1, but substituting 11,21,21-triphenyl-eburicane - 3β,11β,16α,21 - tetrol (XL) for eburicoic acid yields 3,16-diacetyl-11,21,21-triphenyl-eburicane-3β,11β,16α,21-tetraol (XXXIX).

EXAMPLE 56

*3,16-Diacetyl-21,21-Diphenyl-Δ⁸,²⁰-Eburicadiene-3β,16α-Diol (XXVIII)*

Following the procedure set forth in Example 28 but substituting 3,16-diacetyl-21,21-diphenyl-Δ⁸-eburicene-3β,16α,21-triol (XXV) for 21,21-diphenyl-Δ⁸-eburicene-3β,21-diol yields 3,16-diacetyl-21,21-diphenyl-Δ⁸,²⁰-eburicadiene-3β,16α-diol.

EXAMPLE 57

*3,16-Diacetyl-21,21-Diphenyl-Δ⁷,⁹⁽¹¹⁾,²⁰-Eburicatriene-3β,16α-Diol (XLIX)*

Following the procedure set forth in Example 28 but substituting 3,16-diacetyl-21,21 - diphenyl-Δ⁷,⁹⁽¹¹⁾-eburicadiene-3β,16α,21-triol for 21,21-diphenyl-Δ⁸-eburicene-3β,21 - diol yields 3,16 - diacetyl - 21,21-diphenyl-Δ⁷,⁹⁽¹¹⁾,²⁰-eburicatriene-3β,16α-diol.

This invention may be variously otherwise embodied within the scope of the appended claims.

What is claimed is:

1. A compound selected from the group consisting of steroids having the formulae

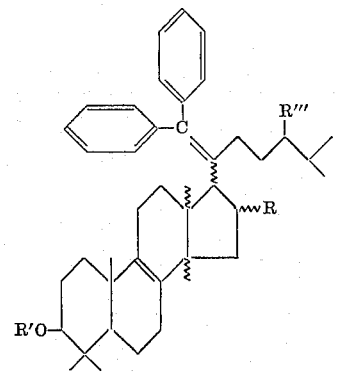

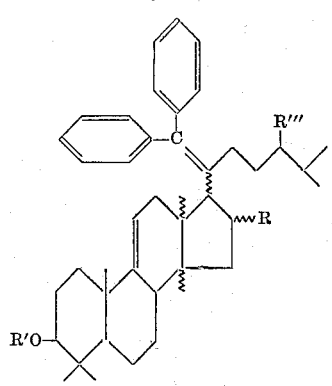

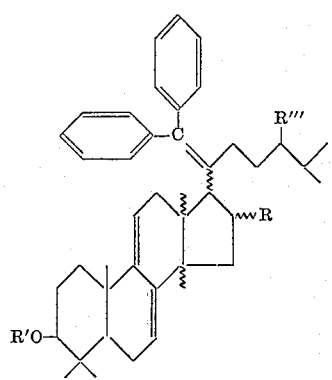

and

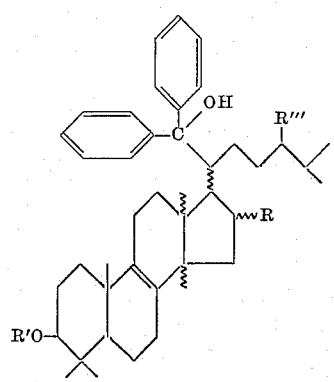

wherein R' is selected from the group consisting of hydrogen and the acyl radical of a hydrocarbon carboxylic acid of less than ten carbon atoms; R''' is selected from the group consisting of hydrogen and lower alkyl; and R is selected from the group consisting of hydrogen, hydroxy and acyloxy, wherein the acyl radical is of a hydrocarbon carboxylic acid of less than ten carbon atoms.

2. A compound selected from the group consisting of steroids having the formulae:

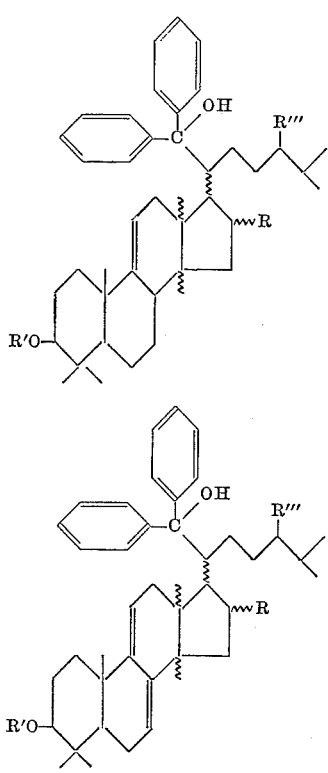

and

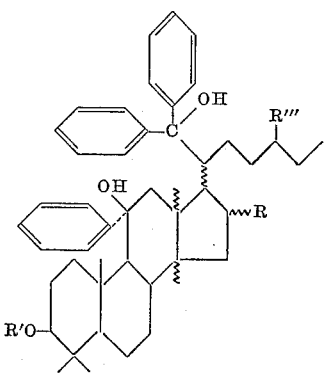

wherein R' is selected from the group consisting of hydrogen and the acyl radical of a hydrocarbon carboxylic acid of less than ten carbon atoms; R''' is selected from the group consisting of hydrogen and lower alkyl; and R is selected from the group consisting of hydrogen, hydroxy and acyloxy, wherein the acyl radical is of a hydrocarbon carboxylic acid of less than ten carbon atoms.

3. A compound selected from the group of steroids consisting of 3-acyloxy-21,21-diphenyl-$\Delta^8$-eburicene-21-ol; 3-acyloxy-21,21-diphenyl-$\Delta^{9(11)}$-eburicene - 21 - ol; and 3-acyloxy-11,21,21-triphenyl-eburicane-11$\beta$,21-diol.

4. A compound selected from the group of steroids consisting of 21,21 - diphenyl - $\Delta^8$ - eburicene-3$\beta$,21-diol; 21,21-diphenyl-$\Delta^{9(11)}$-eburicene-3$\beta$,21-diol; and 11,21,21-triphenyl-eburicane-3$\beta$,11$\beta$,21-triol.

5. A compound selected from the group of steroids consisting of 3-acyloxy-21,21-diphenyl-$\Delta^{8,20}$-eburicadiene; 3-acyloxy - 21,21 - diphenyl-$\Delta^{9(11),20}$-eburicadiene; and 3-acyloxy-11,21,21-triphenyl-$\Delta^{20}$-eburicene-11$\beta$-ol.

6. A compound selected from the group of steroids consisting of 21,21-diphenyl-$\Delta^{8,20}$-eburicadiene - 3$\beta$ - ol; 21,21-diphenyl-$\Delta^{9(11),20}$-eburicadiene-3$\beta$-ol; and 11,21,21-triphenyl-$\Delta^{20}$-3$\beta$,11$\beta$-diol.

7. The process for preparing a compound of claim 1 which comprises dehydrating a corresponding compound of claim 2 by treatment with heat and a dehydrating agent selected from the group consisting of benzene and iodine and glacial acetic acid.

8. The process of producing a compound of claim 2, which comprises reacting a corresponding compound selected from the group of steroids having the formulae:

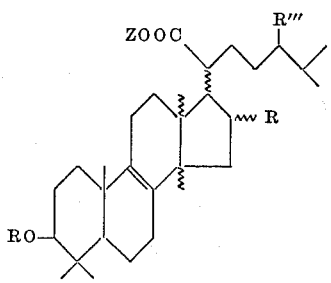

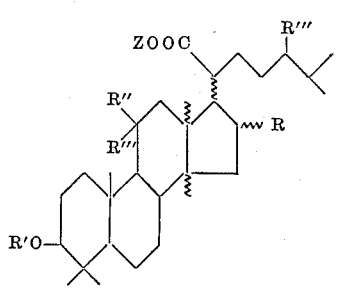

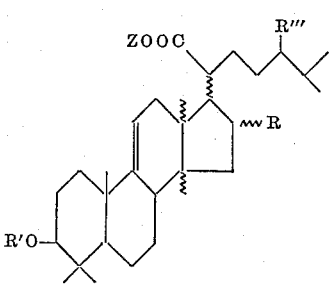

and

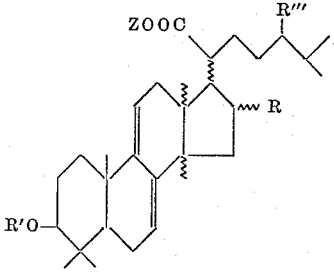

wherein Z is lower alkyl; R is selected from the group consisting of hydrogen, hydroxy and acyloxy, wherein the acyl radical is from a hydrocarbon carboxylic acid of less than ten carbon atoms; R''' is selected from the group consisting of hydrogen and lower alkyl; R' is selected from the group consisting of hydrogen and the acyl radical of a hydrocarbon carboxylic acid of less than ten carbon atoms; each R'' and R''' is selected from the group consisting of hydrogen and hydroxy; and together R'' and R''' is oxo; with a phenyl lithium.

No references cited.

UNITED STATES PATENT OFFICE
CERTIFICATE OF CORRECTION

Patent No. 3,127,423　　　　　　　　　　　　　March 31, 1964

Josef Fried et al.

It is hereby certified that error appears in the above numbered patent requiring correction and that the said Letters Patent should read as corrected below.

Column 9, lines 1 to 20, the first formula should appear as shown below instead of as in the patent:

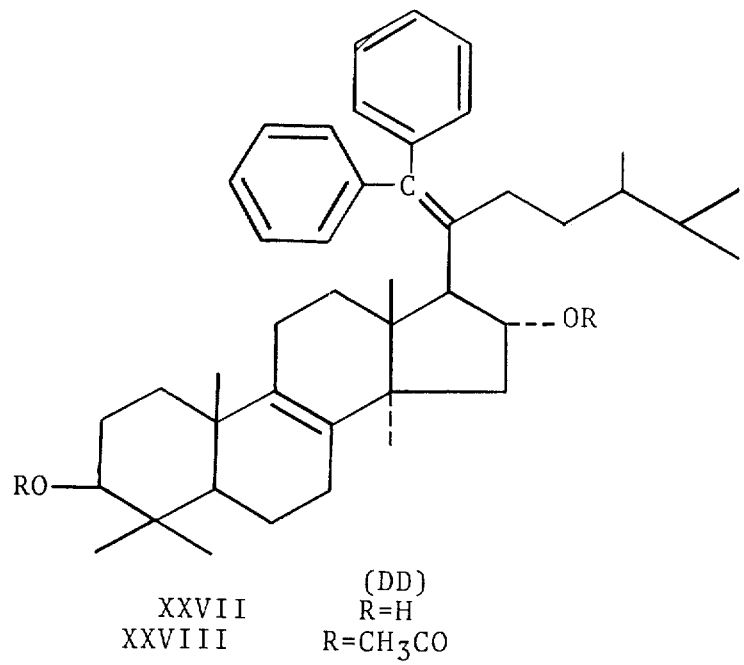

|  | (DD) |
|---|---|
| XXVII | R=H |
| XXVIII | R=CH$_3$CO | same column 9, lines 60 to 75, the third formula should appear as shown below instead of as in the patent:

3,127,423

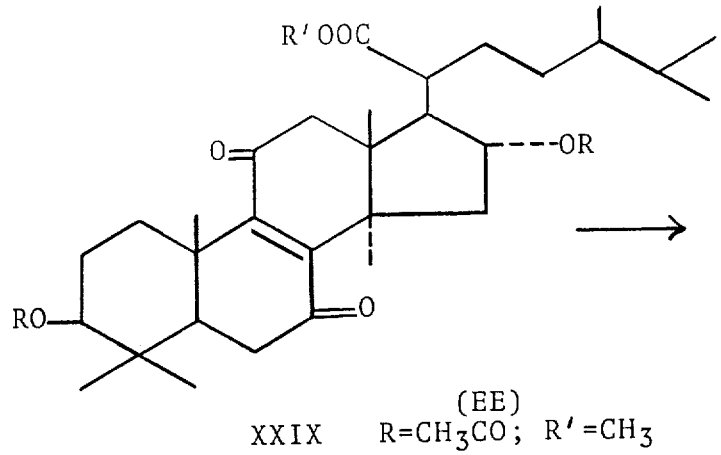

(EE)
XXIX    R=CH₃CO; R'=CH₃ column 10, line 14, for "R=CH₃CO; R'=CH₃" read -- XXX  R=CH₃CO; R'=CH₃ --; line 27, for "XXXI  R=CH₃CO; R₇=CH₃" read -- XXXI  R=CH₃CO; R'=CH₃ --; column 13, line 15, for "XLVI  R=H:R'=CH₃" read -- XLVI  R=H; R'=CH₃ --; column 21, line 60, for "Example 42" read -- Example 43 --; column 22, line 59, for "237 mµ" read -- 247 mµ --.

Signed and sealed this 13th day of October 1964.

(SEAL)
Attest:

ERNEST W. SWIDER
Attesting Officer

EDWARD J. BRENNER
Commissioner of Patents